(12) United States Patent
Tandon et al.

(10) Patent No.: US 10,820,359 B2
(45) Date of Patent: Oct. 27, 2020

(54) GPRS TUNNELING PROTOCOL (GTP) TRAFFIC HUB AND ASSOCIATED METHOD OF USE

(71) Applicant: Syniverse Technologies, LLC, Tampa, FL (US)

(72) Inventors: Ravi Tandon, Sandweiler (LU); Huiyue Xu, Beijing (CN)

(73) Assignee: Syniverse Technologies, LLC, Tampa, FL (US)

( * ) Notice: Subject to any disclaimer, the term of this patent is extended or adjusted under 35 U.S.C. 154(b) by 33 days.

(21) Appl. No.: 16/158,536

(22) Filed: Oct. 12, 2018

(65) Prior Publication Data

US 2019/0116624 A1    Apr. 18, 2019

Related U.S. Application Data

(60) Provisional application No. 62/572,094, filed on Oct. 13, 2017.

(51) Int. Cl.
*H04W 76/12* (2018.01)
*H04W 88/16* (2009.01)
(Continued)

(52) U.S. Cl.
CPC .......... *H04W 76/12* (2018.02); *H04L 63/029* (2013.01); *H04L 63/0209* (2013.01);
(Continued)

(58) Field of Classification Search
CPC ..... H04W 28/02; H04W 28/06; H04W 40/34; H04W 48/16; H04W 76/022;
(Continued)

(56) References Cited

U.S. PATENT DOCUMENTS

2011/0075557 A1*    3/2011   Chowdhury ............ H04L 12/14
                                                    370/230
2012/0287844 A1*    11/2012  Ophir ..................... H04W 28/06
                                                    370/315
(Continued)

FOREIGN PATENT DOCUMENTS

EP             3018937 A1      5/2016

*Primary Examiner* — Harun Chowdhury
(74) *Attorney, Agent, or Firm* — Smith & Hopen, P.A.; Molly L. Sauter

(57) ABSTRACT

A traffic hub used in mobile communications for data offloading, diversion and security. The traffic hub includes an Evolved Packet Data Gateway (ePDG) module configured to transmit and receive data packets for a mobile device in Roaming Untrusted Wi-Fi network for secured access to an Evolved Packet Core (EPC) network, a Trusted WLAN Access Gateway (TWAG) module configured to transmit and receive the data packets for a mobile device in Roaming Trusted Wi-Fi network for secured access to the EPC network and a General Packet Radio Service (GPRS) Tunneling Protocol (GTP) Proxy (GProxy) module, the GProxy module being the core module of the traffic hub configured to enforce policy rules on the data packets prior to exchanging the data packets with logically selected Peer Gateway General Packet Radio Service (GPRS) Serving Node (GGSN)/Packet Data Network (PDN) Gateway (PGW) and ePDG/TWAG nodes. The GProxy also operates as a GTP-aware firewall to protect Home GGSN/PGW nodes from malicious traffic.

11 Claims, 6 Drawing Sheets

(51) Int. Cl.
  *H04W 28/16* (2009.01)
  *H04W 36/00* (2009.01)
  *H04W 76/22* (2018.01)
  *H04W 36/18* (2009.01)
  *H04L 29/06* (2006.01)
  *H04W 12/08* (2009.01)
  *H04W 28/08* (2009.01)
  *H04W 36/12* (2009.01)
  *H04W 84/04* (2009.01)
  *H04W 84/12* (2009.01)
  *H04W 12/00* (2009.01)

(52) U.S. Cl.
  CPC ........ *H04L 63/0236* (2013.01); *H04L 63/102* (2013.01); *H04W 12/08* (2013.01); *H04W 28/08* (2013.01); *H04W 28/16* (2013.01); *H04W 36/0022* (2013.01); *H04W 36/12* (2013.01); *H04W 36/18* (2013.01); *H04W 76/22* (2018.02); *H04W 88/16* (2013.01); *H04L 63/30* (2013.01); *H04L 63/306* (2013.01); *H04W 12/007* (2019.01); *H04W 84/042* (2013.01); *H04W 84/12* (2013.01)

(58) Field of Classification Search
  CPC ..... H04W 76/12; H04W 88/16; H04W 76/14; H04W 28/08; H04W 36/12; H04W 36/18; H04W 76/22; H04L 12/14; H04L 63/306
  USPC ................ 370/315, 328, 329, 331, 230, 235
  See application file for complete search history.

(56) References Cited

U.S. PATENT DOCUMENTS

2015/0282026 A1* 10/2015 Gupta ................... H04W 76/14
  370/331
2016/0323178 A1* 11/2016 Hammer ............... H04L 63/306
2017/0013513 A1   1/2017 Agarwal et al.

* cited by examiner

GPRS TUNNELING PROTOCOL (GTP) TRAFFIC HUB AND ASSOCIATED METHOD OF USE

CROSS-REFERENCE TO RELATED APPLICATIONS

This application claims priority to U.S. Provisional Patent Application No. 62/572,094, entitled "GTP TRAFFIC HUB FOR DATA OFFLOADING, DIVERSION, AND SECURITY," filed Oct. 13, 2017, the entirety of which is incorporated herein by reference.

BACKGROUND OF THE INVENTION

1. Field of the Invention

This invention relates generally to the field of telecommunications networks, specifically to the mobile packet core network in the General Packet Radio Service (GPRS) of the 3G network, or the Evolved Packet Core (EPC) of the Long-Term Evolution (LTE) network. More specifically, it relates to methods and systems for separating the control plane and data plane modules of the Gateway General Packet Radio Service (GPRS) Serving Node (GGSN) and/or the Packet Data Network (PDN) Gateway (PGW) into independent and distributed nodes.

2. Brief Description of the Related Art

A tremendous increase in mobile data usage with widespread proliferation of smartphone-like devices and increasing popularity of video streaming services has resulted in overloading of 3G and 4G cellular access networks. As a result, it has become important to implement means of offloading data traffic from the cellular access networks. One possible solution is offloading the mobile data traffic from an LTE network to a Wi-Fi network to gain extra capacity and improve overall network performance and per-user throughput.

Currently the telecommunications industry is shifting its focus toward integrating Wi-Fi Radio Access Networks (RANs) into the mobile packet core. In this approach, Wi-Fi would be implemented alongside 3G/LTE as a cornerstone technology in the mobile world and the mobile device would be capable of selecting the best radio access technology based upon the current conditions, which may include signal strength, application type, default to Wi-Fi, etc. Such an implementation is a manual process today, but the industry is moving rapidly toward automating the authentication and connection procedure using a combination of operator and subscriber controls. Under this scheme, all RAN traffic is brought back into the mobile packet core, and from there the traffic is directed to the mobile operator's service complex, the Internet, or a corporate intranet.

However, in order to integrate Wi-Fi RANs into the mobile packet core, the connection to Wi-Fi must be seamless and maintain the same level of security as connecting to the mobile network. Accordingly, there is a need in the art for a system and method for offloading mobile operator data transmissions to a Wi-Fi network that is seamless, policy driven, reduces latency, provides better subscriber experience, and ensures security for the home network.

SUMMARY OF THE INVENTION

In various embodiments, the present invention provides a traffic hub system and method for routing data packets in an EPS system that provides offloading of mobile operator data transmissions to a Wi-Fi network to reduce latency and improve the subscriber experience.

In one embodiment, a method for routing data packets from a mobile device to one or more data packet networks includes, positioning a traffic hub system between a visited network of a mobile device and one or more home gateways of the mobile device, intercepting, at the traffic hub system, data packets transmitted from the mobile device to the one or more home gateways of the mobile device and routing at least a portion of the intercepted data packets to one or more packet data networks, thereby bypassing the one or more home gateways of the mobile device. The traffic hub system comprises one or more of a Trusted Wireless Local Area Network (WLAN) Access Gateway (TWAG), an Evolved Packet Data Gateway (ePDG) and a General Packet Radio Service (GPRS) Tunneling Protocol (GTP) Proxy (GProxy). Additionally, the one or more home gateways of the mobile device may be a Gateway General Packet Radio Service (GPRS) Serving Node (GGSN) or a Packet Data Network (PDN) Gateway (PGW).

The method may further include, enforcing one or more policy rules on the intercepted data packets prior to routing the data packets to the one or more home gateways of the mobile device. Enforcing one or more policy rules on the intercepted data packets may further include, rejecting data packets that do not match one or more access control list parameters, wherein the access control list parameters are selected from Access Point Name (APN), International Mobile Subscriber Identify (IMSI), Mobile Station International Subscriber Directory Number (MSISDN), Header Integrity and Information Elements (IEs) sequence checks. Additionally, the one or more policy rules may be based upon one or more of, allowed access locations, throttling, volume limitations, time limitations, subscriber type, captive portal redirection, traffic restrictions, traffic redirection.

In an additional embodiment, a first portion of the intercepted data packets may be routed to a first packet data network through a first home gateway of the mobile device and a second portion of the intercepted data packets may be routed to a second packet data network through a second gateway of the mobile device.

The data packets may be Non-3GPP IP data packets transmitted from the mobile device over a Trusted Wireless Local Area Network (WLAN), wherein the data packets are intercepted by a Trusted Wireless Local Area Network (WLAN) Access Gateway (TWAG) of the traffic hub system. Additionally, the data packets may be Non-3GPP IP data packets transmitted from the mobile device over an Untrusted Wireless Local Area Network (WLAN), wherein the data packets are intercepted by an Evolved Packet Data Gateway (ePDG) of the traffic hub system.

In a particular embodiment, the traffic hub system is a cloud-based traffic hub system that can be positioned on the IP Exchange (IPX) cloud between the Visited Public Land Mobile Network (VPLMN) and the Home Public Land Mobile Network (HPLMN), wherein the packet data network may be selected from HPLMN, VPLMN or IPX.

In another embodiment, the present invention provides a traffic hub system which includes, an ePDG module configured to intercept data packets for a mobile device in a Roaming Untrusted Wi-Fi network and to provide secured access to one or more home gateways of the mobile device, a TWAG module configured to intercept data packets for a mobile device in a Roaming Trusted Wi-Fi network and to provide secured access to one or more home gateways of the mobile device and a GProxy module coupled to the ePDG module and the TWAG module, the GProxy module configured to enforce policy rules on the intercepted data packets prior to exchanging the data packets with one or more gateways of the mobile device.

The traffic hub system may further include, an SGi interface module coupled to the GProxy module. The SGi interface module is configured to route at least a portion of the intercepted data packets to one or more packet data networks, thereby bypassing the one or more home gateways of the mobile device.

The traffic hub system may also include a GTP tunnel fork module coupled to the GProxy module. The GTP tunnel fork module is configured to fork one or more new GTP tunnels toward a new instance of a packet data network gateway of the mobile device and configured to offload selected data packets destined for an original home gateway, wherein the selected data packets are offloaded by sending the selected data packets to the new packet data network gateway without forwarding the selected data packets to the original home gateway.

In another embodiment, the traffic hub system may include, a firewall module coupled to the GProxy module, the TWAG module and the ePDG module. The firewall is configured to reject data packets that do not match one or more access control list parameters, wherein the access control list parameters are selected from Access Point Name (APN), International Mobile Subscriber Identify (IMSI), Mobile Station International Subscriber Directory Number (MSISDN), Visited Public Land Mobile Network (VPLMN) or Location Awareness, Header Integrity and Information Elements (IEs) sequence checks.

A policy module coupled to the GProxy module may additionally be included in the traffic hub system. The policy module being configured to enforce policies and charging rules on the user device traffic based upon a subscriber profile associated with the user device, wherein the policies include one or more of data blocking or traffic shaping, based on location or volume quota, redirection to captive portals, and triggering notifications.

The traffic hub system may further include a configuration module coupled to the GProxy module, the TWAG module and the ePDG module. The configuration module is configured to initialize one or more functionalities within the traffic hub based upon one or more deployment scenarios selected from the group consisting of a Standalone GProxy mode, a Combined GProxy and ePDG mode, a Combined GProxy and TWAG mode, and a Combined GProxy, TWAG and ePDG mode.

In various embodiments, the traffic hub of the present invention provides mobile network operators with a cost-effective alternate to extend their wireless network coverage into "difficult-to-reach" areas, such as under-ground areas and indoor buildings.

The traffic hub enables local break out of data, whereby user data can directly be exchanged with Packet Data networks instead of routing it via the Home network, thereby lowering latency and improving overall performance and user experience. The traffic hub also acts as a GTP firewall to protect home GGSN/PGW nodes against malicious traffic.

The traffic hub provides an inexpensive backhaul solution to offload the growing amount of video and data traffic on the cellular networks.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

Figure 1:
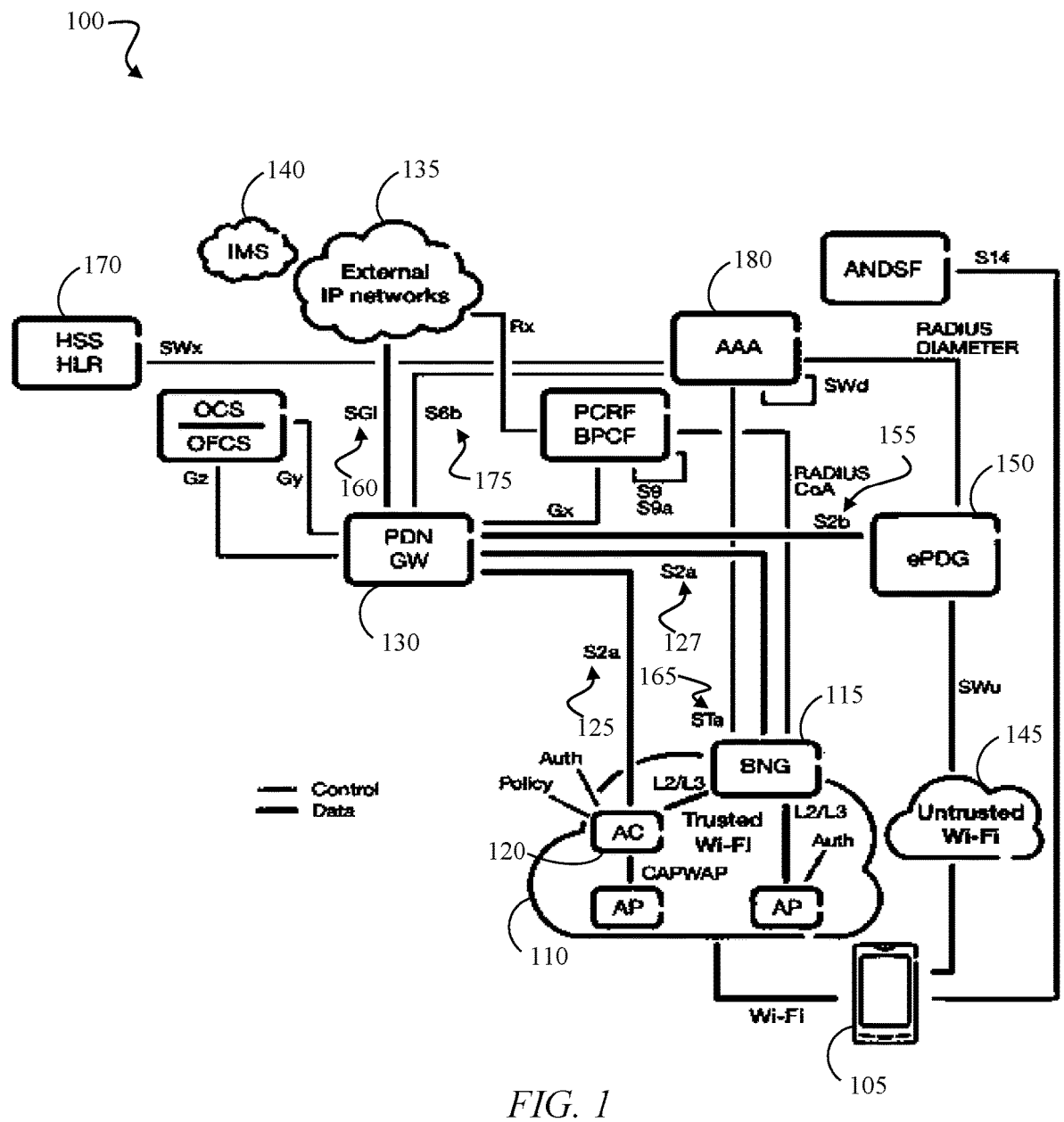
FIG. 1 is a diagram schematically depicting S2a and S2b interfaces.

Cellular and Wi-Fi integration, resulting in Wi-Fi offloading, is a promising technology advancement both from the mobile network operator and the mobile device user perspective. Wi-Fi offload, in the true sense, is intended to be end-user/subscriber agnostic while providing seamless mobility and service.

Currently, the standard Evolved Packet Data Network Gateway (ePDG) and Trusted WLAN Access Gateway (TWAG) nodes send all the Wi-Fi offloaded data back to one or more home Packet Data Network (PDN) gateways, such as a home PDN Gateway (PGW) or a home Gateway General Packet Radio Service (GPRS) Serving Node (GGSN), via S2b and S2a interfaces, respectively. This approach adds additional latency, particularly if the mobile device is roaming. Additionally, there are no security mechanisms to protect the home GGSN/PGW nodes from malicious signaling traffic and malicious data traffic.

In accordance with the present invention, by adding a GTP-Proxy node together with the ePDG and TWAG nodes on the GPRS Exchange (GRX)/IP Exchange (IPX) cloud, while in a roaming scenario, latency can be reduced in addition to providing the advantages of a cloud solution. The traffic hub system of the present invention provides a single traffic hub that can be used to apply policies to Wi-Fi offloaded data traffic for multiple network operators and can protect Home GGSN/PGW nodes from malicious GTP traffic by performing firewall functions.

To successfully integrate Wi-Fi Radio Access Networks (RANs) into the mobile packet core, the experience of connecting to Wi-Fi must be made as simple and secure as the experience of connecting to the mobile network. The services provided must also remain the same and it should be possible to seamlessly handoff between Wi-Fi and Radio Access Network (RAN) technologies. To achieve these goals, the mobile operators must maintain the same level of control, regardless of the RAN type. As such, the present invention positions standard ePDG and TWAG nodes to exchange Wi-Fi data seamlessly with the mobile packet core. Such a solution becomes even more useful when combined with a GTP-Proxy node that has the capability to locally breakout the user data to the internet without forwarding to the Home PGW node, thereby enhancing the user experience by reducing the overall latency and acting as a centrally located node to manage Quality of Service (QoS) and other policies in a roaming environment.

The offloading of Wi-Fi involves a technology used for handover (or selection/reselection) between a Non-Wi-Fi network and a Wi-Fi Network. For a mobile phone user, Wi-Fi Offload provides the user access to a wider bandwidth at a lower cost. For mobile network operators, this solution helps reduce the load on the LTE network by offloading the subscriber to a Wi-Fi network.

The present invention facilitates the interconnection between a Wi-Fi network and a mobile network by providing a combined ePDG, TWAG and GProxy node acting as a traffic hub system. The invention implements a combined ePDG, TWAG and GTP-Proxy node which can be readily deployed on a cloud to act as a traffic hub for enabling multiple services by offloading and diverting user data. This combined node can also function as a firewall to protect Home GGSN/PGWs.

As is known in the prior art, 3GPP ($3^{rd}$ Generation Partnership Project) has developed two different approaches to integrating Wi-Fi into the mobile packet core. The first approach assumes untrusted WLAN access, while the second approach assumes trusted WLAN access. For the trusted access, an S2a interface is utilized for the transmission of data and for the untrusted access, an S2b interface is utilized. FIG. 1 provides a diagram schematically depicting the S2a and S2b interfaces.

FIG. 1 illustrates an exemplary prior art embodiment that does not include the novel traffic hub of the present invention. As shown in FIG. 1, in a standard configuration 100, a mobile device 105 on an untrusted Wi-Fi network 145 is connected to an ePDG 150 in the Evolved Packet Core (EPC) and the ePDG 150 is connected to the Packet Data Network (PDN) Gateway 130 to provide each user session with a secure tunnel over the S2b interface 155. Additionally, the mobile device 105 on a trusted Wi-Fi network 110 is connected to the PDN Gateway 130 through a Broadband Network Gateway (BNG) 115 over the S2a interface 127 or through an Access Controller (AC) 120 over the S2a interface 125. The PDN Gateway 130 may provide the mobile device 105 with access to External IP Networks 135 and an IP multimedia Core Network Subsystem (IMS) 140.

The assumption in untrusted WLAN 145 access is that the mobile operator 105 need not know anything about the Wi-Fi network that originated the connection. The originating operator could be a hotel, restaurant, airport, cable operator, etc. The mobile operator 105 must have a roaming arrangement with that entity but does not need to anything else about the untrusted Wi-Fi 145. The untrusted model requires no changes to the Wi-Fi RAN, but it does have an impact on the user equipment (UE) side, by requiring an IPsec client in the mobile device 105. The UE is connected directly to the ePDG 150 in the EPC through a secure IPsec tunnel. The main function of the ePDG is to secure the data transmission between a mobile user and an untrusted non-3GPP IP access node. EPC unifies voice and data on an Internet Protocol (IP) service architecture and voice is treated as an IP application, thereby allowing mobile network operators to deploy and operate one packet network for 2G, 3G, WLAN, WiMAX, LTE and fixed access (Ethernet, DSL, cable and fiber). The ePDG 150 is connected to the P-GW 130, where each user session is transported through a secure tunnel. Although the user session can be transported over GTP or Proxy Mobile IPv6 (PMIP), the examples in this disclosure refer to GTP only, however such references should not be interpreted in a limited sense. Because the communication is secured end-to-end between the mobile device 105 and the EPC, the untrusted access option can be used with any Wi-Fi network.

The trusted 3GPP Wi-Fi 110 option involves a Trusted Wireless Access Gateway (TWAG) node. The TWAG establishes a GTPv2 tunnel, via the S2a interface 125, 127, to the P-GW 130 in the EPC core for all trusted traffic. The term "trusted traffic" refers to an operator-controlled Wi-Fi environment compatible with 802.1x and Extensible Authentication Protocol (EAP) support to Home Subscriber Server (HSS)/Home Location Register (HLR) 170. The Wi-Fi access point requires support for 802.1x authentication and EAP-Subscriber Identify Module (SIM)/EAP-Authentication and Key Agreement (AKA) methods. This trusted 3GPP Wi-Fi option also requires support for EAP-SIM/AKA in the mobile device 105.

The STa interface 165 is mainly used for EAP client authentication with HSS 170 and S2a option selection, which determines which tunnel type to implement. The S6b 175 interface between 3GPP Authentication, Authorization and Accounting (AAA) 180 and P-GW 130 is used for tunnel authentication, static QoS and mobility (if applicable), etc. SGi 160 is the interface between the Packet Data Network (PDN) Gateway (PGW) 130 and the Packet Data Network (PDN), such as the External IP networks 135 and the IMS 140.

The present invention establishes a traffic hub to converge Non-3GPP networks and 3GPP core networks. The traffic hub of the present invention enhances and extends the S2a and S2b interfaces previously to position the traffic hub function for tapping the Wi-Fi offloaded data from ePDG and TWAG nodes into the mobile core network. The traffic hub is capable of providing policy-based services in addition to locally breaking out the data from the traffic hub node itself. In the present invention the traffic hub provides for GProxy functions for Wi-Fi offloading.

Three exemplary embodiments are provided, including:
(1) S8 Home Routing of Only Signaling messages: In this embodiment, end user Address allocation will be provided by the home PGW itself, i.e., all GTP signaling messages will be exchanged between the Visited Public Land Mobile Network (VPLMN) and the Home Public Land Mobile Network (HPLMN) via the traffic hub, but if required, selective offloading of traffic will be performed by GProxy by sending the data traffic directly to the internet over an SGi interface, thereby reducing latency on the data path.
(2) Local Handling of both Signaling and Data messages: In this embodiment, end user Address allocation will be provided by the GProxy node of the traffic hub itself or by forking a new GTP Tunnel towards a locally positioned PGW instance on the IPX cloud, and data will also be directly exchanged with the PDN over the SGi interface or exchanged with the PDN utilizing the locally positioned PGW instance on the IPX cloud.
(3) S8 Home Routing of both Signaling and Data messages: In this embodiment, all messages will be sent back to the Home GGSN/PGW via the traffic hub, wherein the traffic hub acts as a Firewall to protect the HPLMN from malicious GTP traffic and assists in centralizing the management and applications of policies on the data. Additionally, in the various embodiments of the present invention, logic for selecting the PGW may reside in GProxy, wherein the GProxy logic can be used to select a specific PGW based upon one or more of a subscriber profile, policies, service type, location, latency requirements, total session load or failover conditions.

Figure 2:
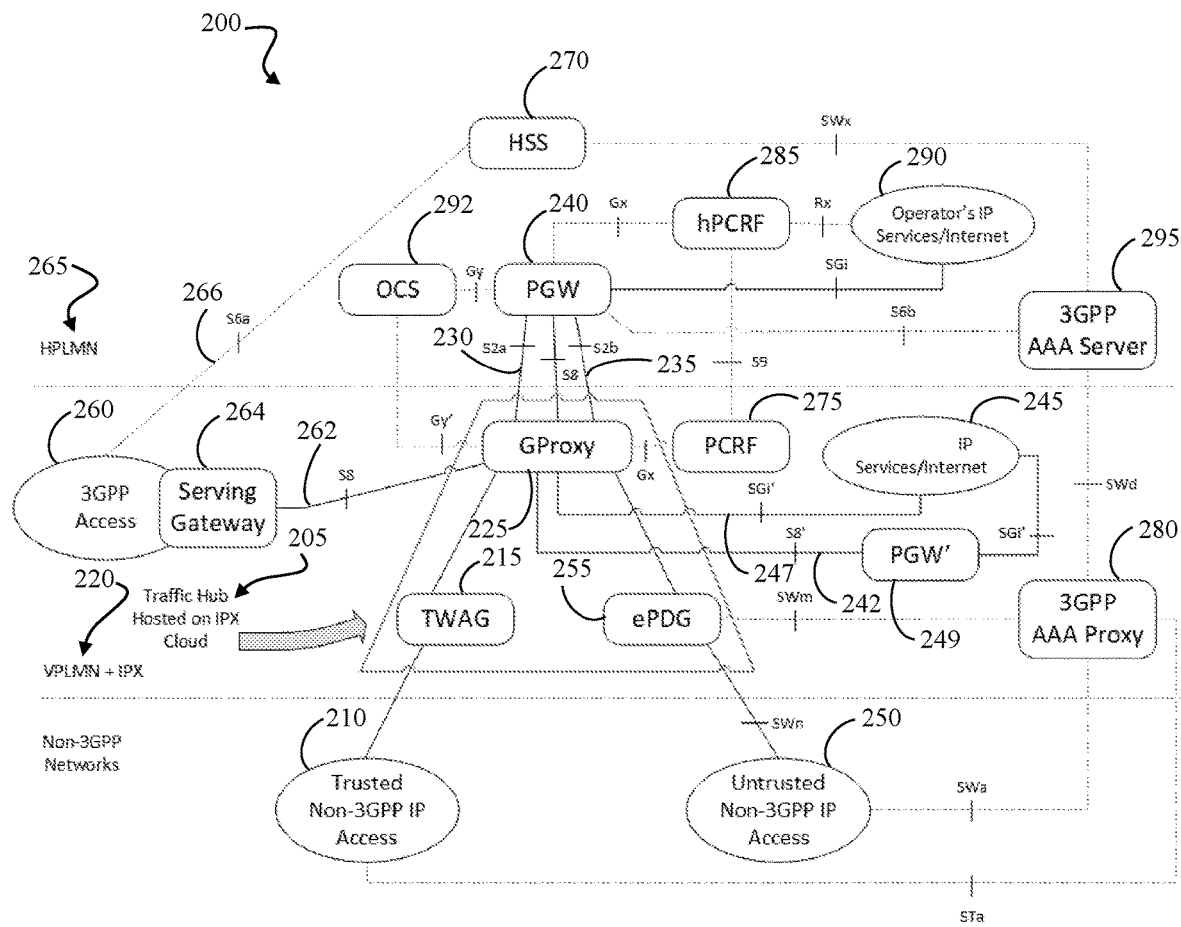
FIG. 2 is a diagram schematically depicting Evolved Packet System (EPS) Architecture via Traffic Hub, S2a-S2b—Home Routed via GProxy and Local Breakout of Selected Traffic, in accordance with an embodiment of the present invention.

FIG. 2 illustrates an Evolved Packet System (EPS) Architecture incorporating the traffic hub, S2a-S2b—Home Routing via GProxy and local breakout of selected traffic. As previously discussed, there is growing market for Wi-Fi data offloading and it is anticipated that the demand for Wi-Fi data offloading will reach new highs in the near future, thereby establishing significant benefits in implementing a traffic hub function for Wi-Fi offload support, in accordance with the present invention.

An EPS architecture 200 incorporating a traffic hub 205, in accordance with the present invention, hosted on an IPX cloud is illustrated in FIG. 2. The inventive traffic hub 205 includes a TWAG node 215, an ePDG node 255 and a GProxy node 225. In general, the GProxy node 225 receives policy and charging rules from the PCRF node 275 and the Online Charging System (OSC) 292 and applies the respective policy and charging rules to the data received via the 3GPP IP Access node 260, the Trusted Non-3GPP IP Access node 210 and/or the Untrusted Non-3GPP IP Access node 260. The GProxy node 225 of the traffic hub 205 then either forwards the data to the Packet Data Network Gateway (PGW) 240 in the HPLMN 265 or offloads the data via the IP Services node 245 or the locally positioned PGW 249.

In particular, a trusted Non-3GPP IP access node 210 provides data packets to the TWAG node 215 of the traffic hub 205 operating in the IPX cloud. The TWAG 215 transmits the data packets to the GProxy node 225 of the traffic hub 205. The GProxy node 225 applies the respective policy and charging rules to the data and then either provides the data packets to the PGW Gateway 240 in the HPLMN 265 over an S2a interface 230 or alternatively, the GProxy node 225 may provide the data packets from the trusted Non-3GPP IP access node 210 to an IP Services node 245 over an SGi interface 247 or to a locally positioned PWG 249 on the IPX cloud, over an S8' interface 242.

Additionally, in the case of an untrusted Non-3GPP IP access node 250, the Non-3GPP IP Access node 250 provides data packets to the ePDG 255 of the traffic hub 205 operating in the IPX cloud. The ePDG 255 transmits the data packets to the GProxy node 225 of the traffic hub 205. The GProxy node 225 applies the respective policy and charging rules to the data and then either provides the data packets to the PWG Gateway 240 in the HPLMN over an S2b interface 235 or alternatively, the GProxy node 225 may provide the data packets from the untrusted Non-3GPP IP access node 250 to an IP Services node 245 over an SGi interface 247 or to a locally positioned PWG 249 on the IPX cloud, over an S8' interface 242.

The 3GPP Access node 260 may also provide data packets to the GProxy node 225 of the traffic hub 205 via a Serving Gateway 264 in the VPLMN 220 over an S8 interface 262. The GProxy node 225 applies the respective policy and charging rules to the data from the 3GPP Access node 250 and then either provides the data packets to the PWG Gateway 240 or alternatively, the GProxy node 225 may provide the data packets from the 3GPP Access node 260 to an IP Services node 245 over an SGi interface 247 or to a locally positioned PWG 249 on the IPX cloud, over an S8' interface 242.

As is common in 3GPP, signaling information may be exchanged between the ePDG node 255 and a 3GPP AAA Server 295 on the HPLMN through a 3GPP AAA Proxy 280 on the VPLMN. Signaling information may additionally be exchanged between the trusted Non-3GPP IP Access node 210 and the 3GPP AAA Proxy node 280 and between the Untrusted Non-3GPP IP Access node 250 and the 3GPP AAA Proxy node 280. The 3GPP access node 260 may also exchange signaling information with a Home Subscriber Server (HSS) 270 over an S6a interface 266 in the HPLMN 265.

The PGW node 240 may additionally route traffic directly to an Operator's IP services node 290. The PGW node 240 may also exchange signaling information with a Home Policy and Charging Rules Function (hPCRF) node 285 and the hPCRF node 285 may then exchange signaling information with the Operator's IP services node 290 in the HPLMN 265. As such, the PGW node 240 may refer to the hPCRF node 285 node, which then refers to the Operator's IP services node to implement Policy Charging Control (PCC) based services.

As illustrated with reference to FIG. 2, in various embodiments, the traffic hub 205 according to the present invention can be used on S2a 230/S2b 235 interfaces to enforce policy and charging rules. The traffic hub 205 will also be used to tap Wi-Fi offloaded data and to apply policy/charging rules, with the assistance the PCRF node 240 and the OCS node 292. The traffic hub 205 can also perform as a firewall to secure the Home GGSN/PGW nodes from malicious traffic.

The traffic hub of the present invention may be configured in multiple ways, depending upon the deployment scenario. The various following configurations are supported.

Figure 3:
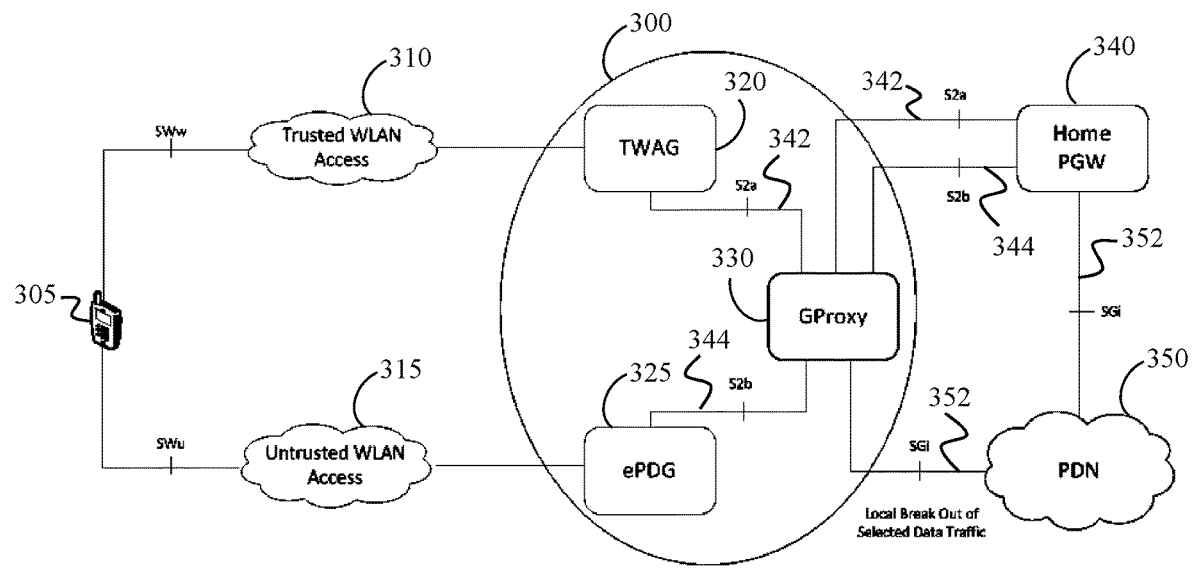
FIG. 3 is a diagram schematically depicting S2a, S2b and SGi interfaces via traffic hub acting as combined ePDG, TWAG and GProxy, in accordance with an embodiment of the present invention.

FIG. 3 depicts a first exemplary embodiment in which the traffic hub 300 operates as combined ePDG 325, TWAG 320 and GProxy 330 via S2a 342, S2b 344, and SGi 352 interfaces, respectively. In this embodiment, data packets from a mobile device 305 provided over a Trusted WLAN Access 310 are intercepted at the TWAG 320 of the traffic hub 300 and routed to the GProxy 330 over the S2a interface 342. Data packets from the mobile device 305 provided over an Untrusted WLAN access 315 are also intercepted at the ePDG 325 of the traffic hub 300 and routed to the GProxy 330 over the S2b interface 344. The GProxy 330 may then route the intercepted data packets to a logically selected Home PGW 340 for subsequent routing to a Packet Data Network (PDN) 350 over the SGi interface 352. Alternatively, the GProxy 330 may provide a local break out of selected data traffic, which is then routed directly to the PDN 350 over the SGi interface or sent to a locally positioned most favorable PGW for further processing 352, thereby bypassing the Home PGW 340.

Figure 4:
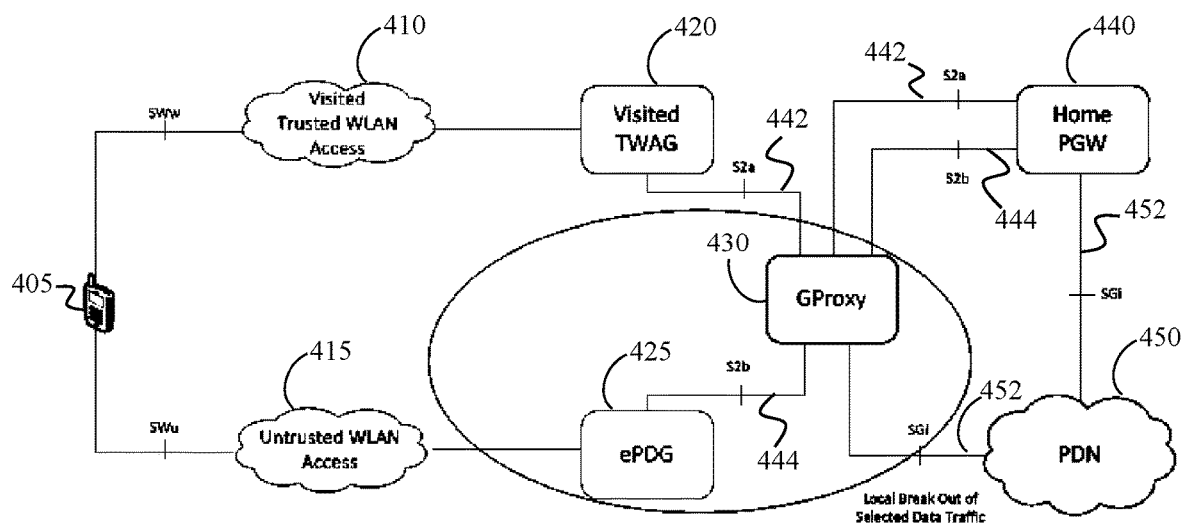
FIG. 4 is a diagram schematically depicting S2a, S2b and SGi interfaces via traffic hub acting as combined ePDG and GProxy, in accordance with an embodiment of the present invention.

FIG. 4 depicts a second exemplary embodiment in which the traffic hub 400 operates as combined ePDG 425, and GProxy 430 via S2a 442, S2b 444, and SGi 452 interfaces. In this embodiment, data packets from a mobile device 405 provided over a Visited Trusted WLAN Access 410 are received at a Visited TWAG 420 and routed to the GProxy 430 over the S2a interface 442. Data packets from the mobile device 405 provided over an Untrusted WLAN access 415 are intercepted at the ePDG 425 of the traffic hub 400 and routed to the GProxy 430 over the S2b interface 444. The GProxy 430 may then route the intercepted data packets to a logically selected Home PGW 440 for subsequent routing to a Packet Data Network (PDN) 450 over the SGi interface 452. Alternatively, the GProxy 430 may provide a local break out of selected data traffic, which is then routed directly to the PDN 450 over the SGi interface 452, thereby bypassing the Home PGW 440.

Figure 5:
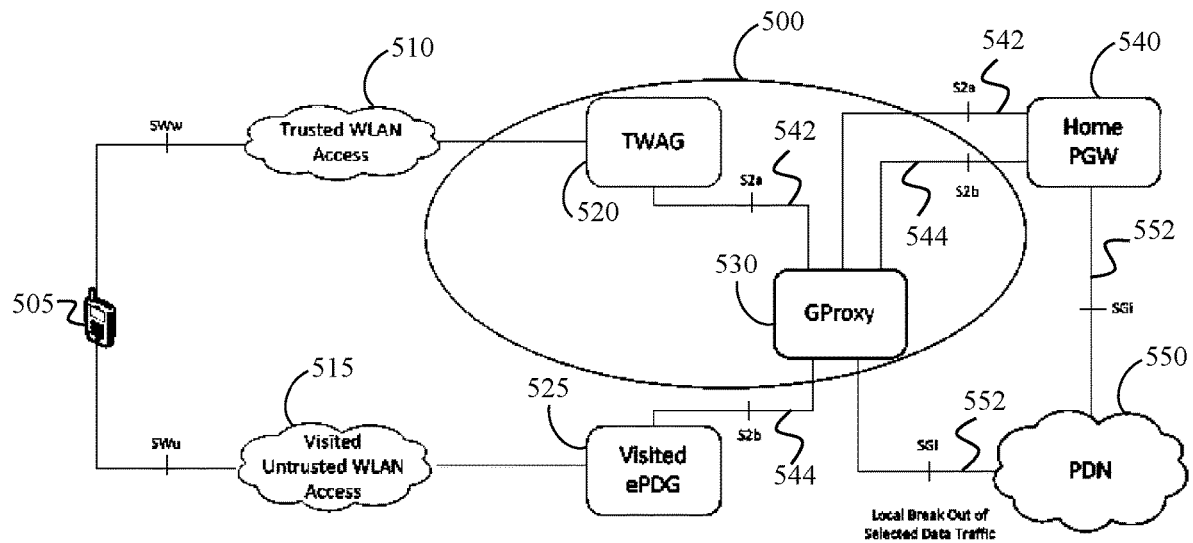
FIG. 5 is a diagram schematically depicting S2a, S2b and SGi interfaces via traffic hub acting as combined TWAG and GProxy, in accordance with an embodiment of the present invention.

FIG. 5 depicts a third exemplary embodiment in which the traffic hub 500 operates as combined TWAG 520 and GProxy 530 via S2a 542, S2b 544, and SGi 552 interfaces. In this embodiment, data packets from a mobile device 505 provided over a Visited Untrusted WLAN Access 515 are received at a Visited ePDG 525 and routed to the GProxy 530 over the S2b interface 544. Data packets from the mobile device 505 provided over a Trusted WLAN access 510 are intercepted at the TWAG 520 of the traffic hub 500 and routed to the GProxy 530 over the S2a interface 542. The GProxy 530 may then route the intercepted data packets to a logically selected Home PGW 540 for subsequent routing to a Packet Data Network (PDN) 550 over the SGi interface 552. Alternatively, the GProxy 530 may provide a local break out of selected data traffic, which is then routed directly to the PDN 550 over the SGi interface 552, thereby bypassing the Home PGW 540.

Figure 6:
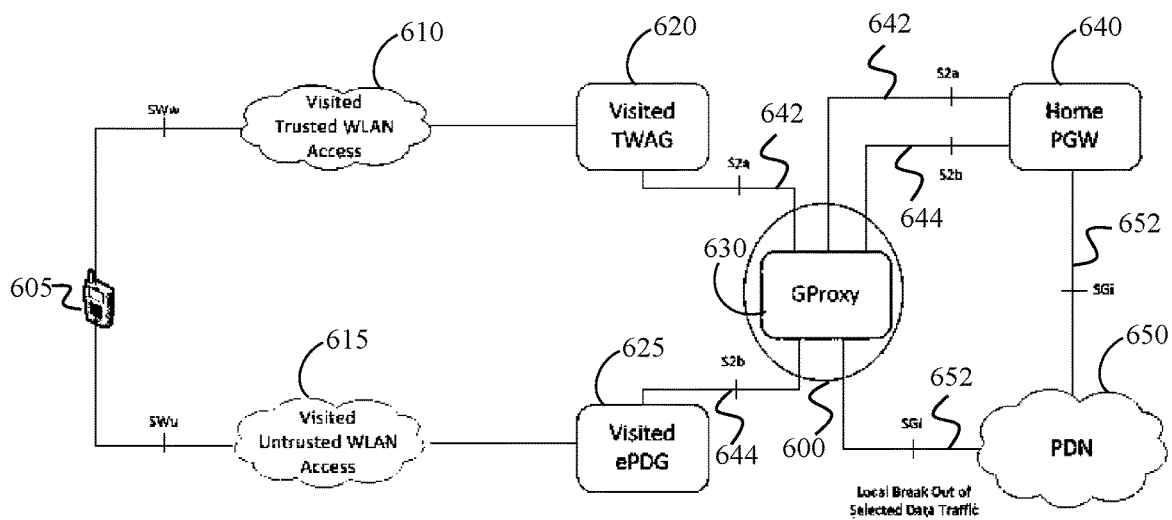
FIG. 6 is a diagram schematically depicting S2a, S2b and SGi interfaces via traffic hub acting as Standalone GProxy, in accordance with an embodiment of the present invention.

FIG. 6 depicts a fourth exemplary embodiment in which the traffic hub 600 operates as a standalone GProxy 630. The standalone GProxy node 630 supports SGi 652, S2a 642 and S2b 644 interfaces between Home GGSN/PGW nodes 640 and VPLMN SGSN/SGW, TWAG 620 and ePDG nodes 625, respectively. In this embodiment, data packets from a mobile device 605 provided over a Visited Untrusted WLAN Access 615 are received at a Visited ePDG 625 and routed to the GProxy 630 over the S2b interface 644. Data packets from the mobile device 605 provided over a Visited Trusted WLAN access 610 are received at the Visited TWAG 620 and routed to the GProxy 630 over the S2a interface 642. The GProxy 630 may then route the intercepted data packets to a logically selected Home PGW 640 for subsequent routing to a Packet Data Network (PDN) 650 over the SGi interface 652. Alternatively, the GProxy 630 may provide a local break out of selected data traffic, which is then routed directly to the PDN 650 over the SGi interface 652, thereby bypassing the Home PGW 640.

Figure 7:
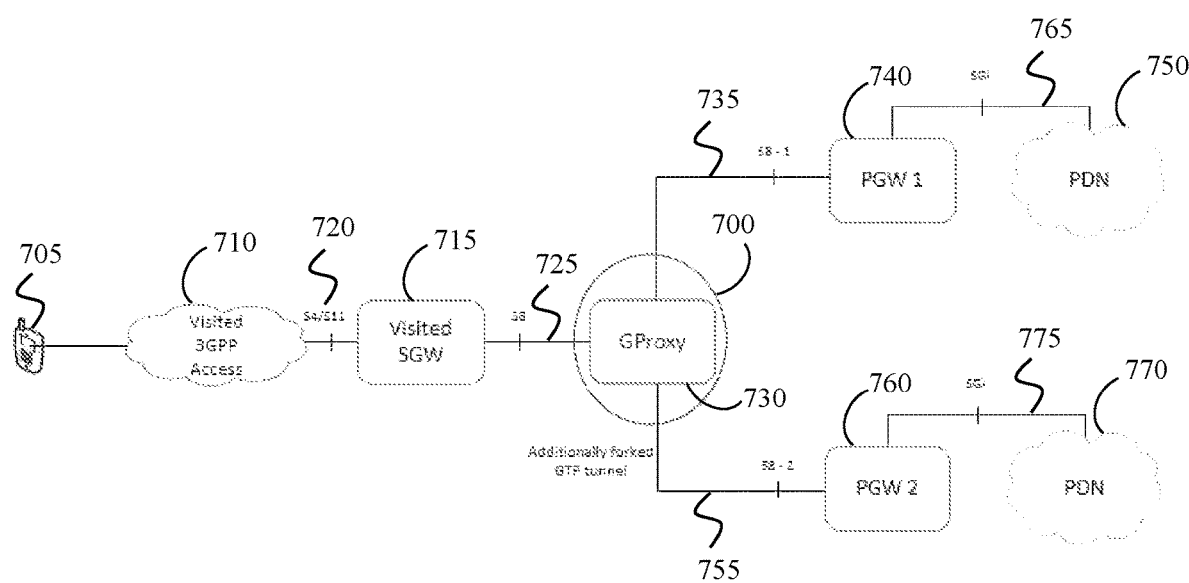
FIG. 7 is a diagram schematically depicting S8 interfaces with additional GTP tunnels vis traffic hub acting as a standalone GProxy, in accordance with an embodiment of the present invention.

FIG. 7 depicts a fifth exemplary embodiment in which the traffic hub 700 operates as a Standalone GProxy 730 supporting multiple S8 interfaces 735, 755 by forking additional GTP tunnels towards most favorable GGSN/PGW nodes depending upon service type, policy, latency requirements, load and failover conditions. 740, 760. In this embodiment, data packets from a mobile device 705 provided over a Visited 3GPP Access 710 are received at a Visited SGW 715 over a S4/S11 interface 720. The data packets are then routed to the GProxy 730 over an S8 interface 725. The GProxy 730 may then operate by forking additional GTP tunnels towards multiple instances of PGW, such as PGW 1 740 and PGW 2 760. The GProxy 730 may route traffic over S8-1 interface 735 to PGW 1 740 and may additionally route traffic over S8-2 interface 755 to PGW 2 760. PGW 1 740 may then route data packets to a PDN 750 over an SGi interface 765 and PGW 2 may route data packets to PDN 770 over an SGi interface 775. Depending upon policy requirements GProxy 730 will be capable of locally breaking out the selective traffic directly toward one or more PDN 750, or by forking additional GTP tunnels towards another instance of PGW 760. For example, it will be possible for GProxy 730 of the traffic hub 700 to send all data traffic to PGW 1 740, except for www.facebook.com related traffic, which will be send to PGW 2 760.

Figure 8:
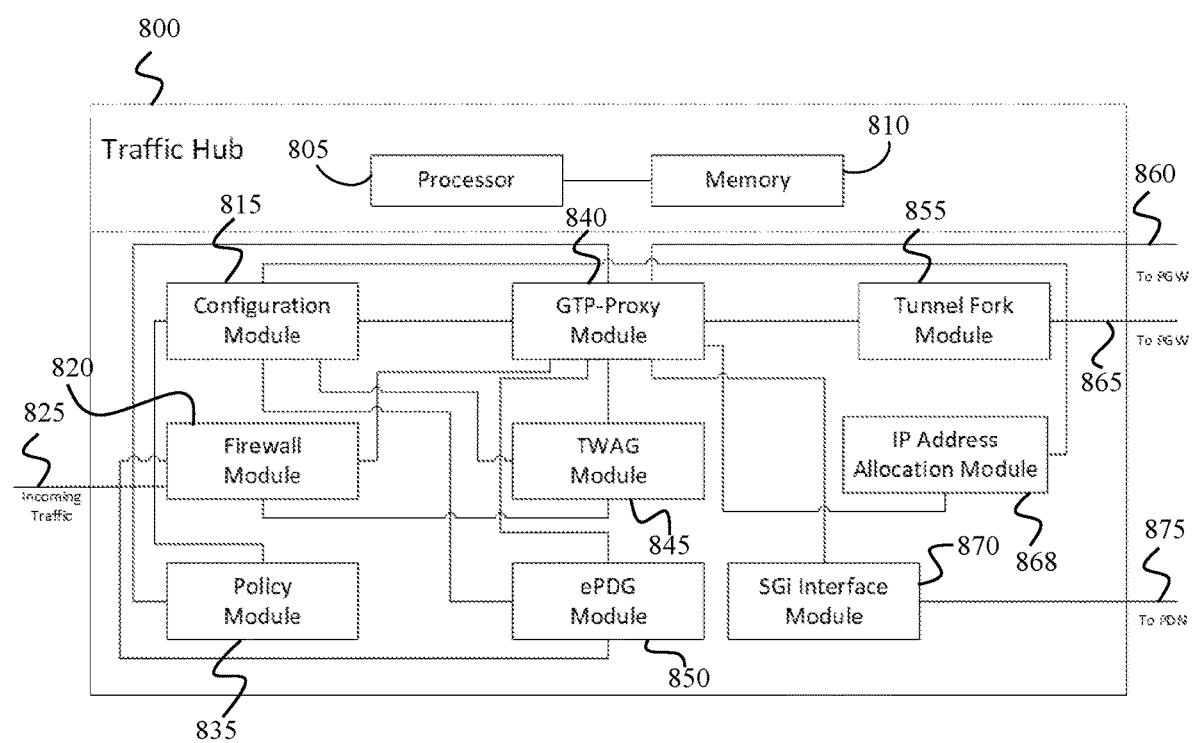
FIG. 8 is a diagram schematically depicting the various traffic hub modules, in accordance with an embodiment of the present invention.

FIG. 8 illustrates the various modules of the traffic hub 800, in accordance with an embodiment of the present invention. The traffic hub 800 includes a processor 805 and a memory 810 coupled to the processor 805. The traffic hub 800 additionally includes a configuration module 815, a firewall module 820 and a policy module 835 for receiving incoming traffic 825. The configuration module 815 is coupled to a GTP-Proxy module 840, a TWAG module 845 and an ePDG module 850. The firewall module 820 is coupled to the GTP-Proxy module 840, the TWAG module 845 and the ePDG module 850. The policy module 835 is coupled to the configuration module 815 and the GTP-Proxy module 840. The TWAG module 845 and the ePDG module 850 are coupled to the GTP-Proxy module 840. The GTP-Proxy module is coupled to a tunnel fork module 855, a PGW 860 and an SGi interface module 870. The tunnel fork module 855 is coupled to a PGW 865. The SGi interface module 870 is coupled to a PDN 875. The IP address allocation module 868 is coupled to the GTP-Proxy module 840 and the configuration module 815.

In exemplary operation of the various modules of the traffic hub 800, the ePDG module 850 sends and receives data for a mobile device in Roaming Untrusted Wi-Fi network for secured access to EPC network. The TWAG module 845 sends and receives data for a mobile device in Roaming Trusted Wi-Fi network for secured access to the EPC network. The GTP-Proxy module 840 enforces policy rules on data prior to exchanging it with peer GGSN/PGW and ePDG/TWAG nodes, in addition to acting as a GTP aware firewall to protect Home GGSN/PGW nodes from malicious traffic.

Policy decisions made by the GProxy of the traffic hub may include one or more of the following, depending upon the business needs: (1) Allowed locations for access, (2) Throttling by modifying session QoS or by enforcing traffic shaping, (3) Volume/Time limitations, (4) Subscriber type and (5) Captive portal redirection (6) PGW Selection based on policy, latency, location, load balancing and fail-over conditions.

The SGi interface module 870 offloads complete or partial subscriber data traffic, wherein the selected data traffic is offloaded by sending it directly to the PDN over the SGi interface without forwarding it to Home GGSN/PGW nodes, so as to reduce latency and improve the subscriber experience.

The GTP tunnel fork module 855 forks an additional GTP tunnel towards another instance of PGW to offload selective subscriber data traffic, wherein the selected data traffic is offloaded by sending it to another instance of GGSN/PGW over and Gp/S8 interface without forwarding it to the original instance of Home GGSN/PGW node in order to achieve specific policy requirements.

The GTP aware firewall module 820 is configured to drop both signaling and user data traffic which fails to match the access control list parameters based on one or more of, International Mobile Subscriber Identify (IMSI) Prefix Awareness, Mobile Station International Subscriber Directory Number (MSISDN) Prefix Awareness, Access Point Name (APN) Awareness, Visited Public Land Mobile Network (VPLMN) or Location Awareness, header integrity and information elements sequence checks.

The policy module 835 is configured to enforce policies and charging rules on subscriber traffic depending upon his or her profile. Policies may include one or more of, data blocking or traffic shaping depending upon location or volume quota, redirection to captive portals and triggering notifications.

The configuration module 815 is configured to bring up the traffic hub 800 with a particular set of functionalities needed as per the deployment scenarios. The configuration module 815 can bring up the system in different modes including, standalone GProxy mode, combined GProxy and ePDG mode, combined GProxy, TWAG and ePDG mode, depending upon the type of functionality and features that are needed to be supported by the traffic hub 800.

The IP address allocation module 868 is configured to allocate an IP address to the mobile device, wherein the IP address allocated by the IP address allocation module of the traffic hub system is different than an IP address allocated by one or more gateways and wherein the one more gateways includes a home gateway (PGW) and a local gateway (PGW). The IP address allocation module 868 is further configured to maintain a one-to-many relationship between the IP address allocated by the IP address allocation module and the corresponding IP addresses allocated by the one or more gateways (PGW).

As is known in the art, the processor 805, memory 810, configuration module 815, firewall module 820, policy module 835, GTP-Proxy module 840, TWAG module 845, ePDG module 850, tunnel fork module 855, the IP address allocation module 868 and SGi interface module 870 of the traffic hub 800 may be implemented utilizing a combination of circuitry and software.

The traffic hub of the present invention supports GTPv1/v2 and strictly enforces standard use of the GTP protocol, both in structure and in flow, securing Home GGSN/PGW servers from malicious traffic. The traffic hub validates that each GTP message contains the correct set of Information Elements in the proper sequence, if needed, prior to forwarding the message to Home GGSN/PGW nodes.

The traffic hub ensures that only valid GTP traffic is passed through. For example, data packets are only allowed for established PDP contexts/Sessions, while Signaling messages like PDP Context Update Request, Modify Bearer Request etc. are not allowed for closed PDP contexts/sessions. The traffic hub will also support blacklisting of configured malicious sites so that no data is exchanged with respective servers of those sites to safeguard subscribers and Home network operators.

The following are some exemplary advantages of the traffic hub of the present invention illustrating the benefits of the Wi-Fi offloading provided by the traffic hub: (1) High bandwidth consuming services can be locally broken out or redirected towards a preferred PGW depending upon the HPLMN's or statically defined policy and load conditions, (2) Caters to the growing mobile data demand and the smart devices usage patterns that have the characteristics of short sessions, high throughput and low latency, (3) Enhances the end user experience by improving service capacity, security and capability by lowering the overall latency in core network, irrespective of the access network used.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various FIG.s, it is to be understood that other similar embodiments can be used, or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for routing data packets from a mobile device to one or more packet data networks (PDN), the method comprising:

positioning a traffic hub system between a visited 3rd Generation Partnership Project (3GPP) network of a mobile device, a trusted Non-3GPP network, an untrusted Non-3GPP network and one or more home packet data network (PDN) gateways (PGWs) of the mobile device;

intercepting, at the traffic hub system, data packets transmitted from the mobile device to the one or more home packet data network (PDN) gateways (PGWs) of the mobile device;

forking, with a tunnel fork module, one or more new General Packet Radio Service (GPRS) Tunneling Protocol (GTP) tunnels toward a new instance of a packet data network (PDN) gateway (PGW) for the mobile device, wherein the new instance of a PGW for the mobile device is a different gateway than the one or more home PGWs of the mobile device and is a different gateway than a local PGW of the visited network of the mobile device and wherein the new instance of the PGW is not a PGW of the traffic hub system;

selecting a PGW from the home PGWs, the local PGWs and the new instance PGWs based upon one or more of a subscriber profile, policies, service type, location, latency requirements, total session load or failover conditions; and when the new instance of the PGW for the mobile device is selected, routing selected intercepted data packets destined for the one or more home PGWs of the mobile device to the new instance of the PGW without forwarding the selected intercepted data packets to the one or more home PGWs of the mobile device, thereby bypassing the one or more home PGWs of the mobile device.

2. The method of claim 1, further comprising:

when the local PGW of the visited network of the mobile device is selected, routing selected intercepted data packets destined for the one or more home PGWs of the mobile device to the local PGW of the visited network of the mobile device, thereby bypassing the one or more home PGWs of the mobile device.

3. The method of claim 1, further comprising:
allocating, with an IP address allocation module, an IP address to the mobile device, wherein the IP address allocated to the mobile device by the IP address allocation module is different than an IP address allocated to the mobile device by the local PGW and is different than an IP address allocated to the mobile device by the one or more home PGWs; and
maintaining a one-to-many relationship between the IP address allocated to the mobile device by the IP address allocation module and the corresponding IP addresses allocated by the one or more home PWGs of the mobile device and the local PGW of the mobile device.

4. The method of claim 1, further comprising, enforcing one or more policy rules on the intercepted data packets prior to routing the selected intercepted data packets.

5. The method of claim 4, wherein enforcing one or more policy rules on the intercepted data packets prior to routing the selected intercepted data packets further comprises, rejecting selected intercepted data packets that do not match one or more access control list parameters, wherein the access control list parameters are selected from Access Point Name (APN), International Mobile Subscriber Identify (IMSI), Mobile Station International Subscriber Directory Number (MSISDN), Visited Public Land Mobile Network (VPLMN) or Location Awareness, Header Integrity and Information Elements (IEs) sequence checks.

6. The method of claim 4, wherein the one or more policy rules may be based upon one or more of, allowed access locations, throttling, volume limitations, time limitations, subscriber type, captive portal redirection, traffic restrictions, traffic redirection.

7. The method of claim 1, wherein the traffic hub system comprises one or more of a Trusted Wireless Local Area Network (WLAN) Access Gateway (TWAG), an Evolved Packet Data Gateway (ePDG) and a General Packet Radio Service (GPRS) Tunneling Protocol (GTP) Proxy (GProxy).

8. The method of claim 1, wherein the selected PGW for the mobile device is a most favorable packet data network (PDN) gateway (PGW) for the mobile device.

9. The method of claim 1, wherein the packet data network is selected from an IP Exchange (IPX) a Visited Public Land Mobile Network (VPLMN) and a Home Public Land Mobile Network (HPLMN).

10. The method of claim 8, wherein the most favorable PGW for the mobile device provides a best subscriber experience based on availability, policy, load balancing and failover conditions.

11. A method for routing data packets from a mobile device to one or more packet data networks, the method comprising:

positioning a traffic hub system between a visited 3rd Generation Partnership Project (3GPP) network of a mobile device, a trusted Non-3GPP network, an untrusted Non-3GPP network and one or more home packet data network (PDN) gateways (PGWs) of the mobile device, wherein the traffic hub system comprises a Trusted Wireless Local Area Network (WLAN) Access Gateway (TWAG), an Evolved Packet Data Gateway (ePDG) and a General Packet Radio Service (GPRS) Tunneling Protocol (GTP) Proxy (GProxy);

intercepting, at the GProxy of the traffic hub system, data packets transmitted from the mobile device to the one or more home PGWs of the mobile device;

intercepting, at the TWAG of the traffic hub system, data packets transmitted from a trusted non-3GPP IP access node to the one or more home PGWs of the mobile device;

intercepting, at the ePDG of the traffic hub system, data packets transmitted from an untrusted non-3GPP IP access node to the one or more home PGWs of the mobile device;

forking, with a tunnel fork module, one or more new General Packet Radio Service (GPRS) Tunneling Protocol (GTP) tunnels toward a new instance of a packet data network (PDN) gateway (PGW) for the mobile device, wherein the new instance of a PGW for the mobile device is a different gateway than the one or more home PGWs of the mobile device and is a different gateway than a local PGW of the visited network of the mobile device and wherein the new instance of the PGW is not a PGW of the traffic hub system;

routing selected data packets intercepted at the GProxy, the TWAG and ePDG to the local PGW of the visited network of the mobile device or to the new instance of a PGW, without forwarding the selected intercepted data packets to the one or more home PGWs of the mobile device, thereby bypassing the one or more home PGWs of the mobile device; and enforcing one or more policy rules on the selected intercepted data packets prior to routing the selected intercepted data packets to the local PGW of the visited network of the mobile device or to the new instance of a PGW.

* * * * *